US006860465B2

(12) United States Patent
Tseng

(10) Patent No.: US 6,860,465 B2
(45) Date of Patent: Mar. 1, 2005

(54) METHOD FOR CONTROLLING A BUTTERFLY VALVE

(75) Inventor: Chin-Lien Tseng, Hsinchu (TW)

(73) Assignee: Macronix International Co., Ltd., Hsinchu (TW)

(*) Notice: Subject to any disclaimer, the term of this patent is extended or adjusted under 35 U.S.C. 154(b) by 73 days.

(21) Appl. No.: 10/387,487

(22) Filed: Mar. 14, 2003

(65) Prior Publication Data

US 2004/0178376 A1 Sep. 16, 2004

(51) Int. Cl.[7] ............................................. F16K 51/00
(52) U.S. Cl. ................................................ 251/129.04
(58) Field of Search ........................... 251/129.04, 305, 251/306, 307, 308

(56) References Cited

U.S. PATENT DOCUMENTS

| 3,888,459 | A | * | 6/1975 | Bubniak ...................... 251/305 |
| 4,697,734 | A | * | 10/1987 | Ueda ............................ 236/13 |
| 4,747,942 | A | * | 5/1988 | Strauss ........................ 251/308 |
| 6,178,928 | B1 | * | 1/2001 | Corriveau ................. 123/41.12 |
| 6,202,628 | B1 | * | 3/2001 | Iwano et al. ........... 123/339.16 |
| 6,223,700 | B1 | * | 5/2001 | Sano et al. ................. 123/41.1 |
| 6,305,351 | B1 | * | 10/2001 | Neumann et al. ............ 123/399 |
| 6,340,005 | B1 | * | 1/2002 | Keast et al. ................. 123/527 |
| 6,568,416 | B2 | * | 5/2003 | Tucker et al. ................... 251/5 |

FOREIGN PATENT DOCUMENTS

| DE | 3630233 C2 | * | 10/1992 |
| WO | WO 99/60255 | * | 11/1999 |

* cited by examiner

Primary Examiner—John Bastianelli
(74) Attorney, Agent, or Firm—Shaw Pittman LLP

(57) ABSTRACT

A method of operating a butterfly valve that includes defining the stem stroke of the butterfly valve into a first, a second and a third operation regions, wherein the first operation region corresponds to a lower stem stroke, and the third operation region corresponds to a higher stem stroke of the butterfly valve, providing a first set of PID parameters for the first operation region such that the butterfly valve functions as an on/off control valve in the first operation region, providing a second set of PID parameters for the second operation region such that the butterfly valve functions as a percentage control valve in the second operation region, and providing a third set of PID parameters for the third operation region such that the butterfly valve functions as an on/off control valve in the third operation region, wherein the first and third sets of PID parameters produce a greater output level than the second set of PID parameters.

21 Claims, 2 Drawing Sheets

METHOD FOR CONTROLLING A BUTTERFLY VALVE

TECHNICAL FIELD

This invention pertains in general to a valve and, more particularly, to a method of operating a valve.

BACKGROUND

Valves have long been used to control the volume of flow of fluids or gas in a piping system, for example, heating, ventilation or air-conditioning system. Conventional valves may include on/off control valves and percentage control valves. An on/off-type valve usually includes a valve stem that moves through its entire length between a fully-open and a fully-closed state or position. Unlike on/off control valves, the valve stem of a percentage control valve primarily actuates through a percentage of the available stem stroke length. Although percentage control valves may perform precise control of the volume of flow in a piping system, they are more expensive than on/off control valves.

A conventional butterfly valve is usually employed as an on/off control valve, and it has also been used as a percentage control valve in a piping system to achieve the cost efficiency of an on/off control valve and the ability to precisely control flow volume of a percentage control valve. The characteristics curve of a butterfly valve when used for percentage control is shown in FIG. 1. Referring to FIG. 1, the horizontal coordinate is the stem stroke of a valve stem of a butterfly valve, and the vertical coordinate is the flow ratio between the current volume of flow and the maximum volume of flow of a butterfly valve. Straight line L represents an ideal relationship between stem stroke and flow ratio in percentage control pf flow. Curve S represents an actual situation of a butterfly valve used for percentage control.

Curve S may be divided into three regions A, B and C. Region A corresponds to approximately the 0-th to $28^{th}$ percentage of the entire stem stroke, and is only responsible for the first 10% of the maximum volume of flow. Therefore, a butterfly valve operates with inefficiency in region A. Likewise, region C corresponds to approximately the $75^{th}$ to $100^{th}$ percentage of the entire stem stroke, and is only responsible for the last 10% of the maximum volume of flow. Therefore, region C is also an inefficient operation region for the butterfly valve. In addition, the valve stem of a butterfly valve may be susceptible to oscillation when the butterfly valve operates in region A or C.

Region B corresponds to approximately the $28^{th}$ to $75^{th}$ percentage of the entire stem stroke, and is responsible for 80% of the maximum volume of flow. Unlike region A or C, region B is an efficient operation region for a butterfly valve. However, as compared with ideal line L, curve S prior to the intersection point W represents that the butterfly valve provides insufficient volume of flow, and represents excessive volume of flow after the intersection point W. This is known as a "hunting problem." Specifically, it is difficult for a butterfly valve to "hunt" for a desired output level when it is operating in region B.

SUMMARY OF THE INVENTION

Accordingly, the present invention is directed to a method that obviates one or more of the problems due to limitations and disadvantages of the related art.

Additional features and advantages of the present invention will be set forth in the description which follows, and in part will be apparent from the description, or may be learned by practice of the invention. The objectives and other advantages of the invention will be realized and attained by the methods particularly pointed out in the written description and claims thereof, as well as the appended drawings.

To achieve these and other advantages, and in accordance with the purpose of the invention as embodied and broadly described, there is provided a method of operating a butterfly valve that includes defining the stem stroke of the butterfly valve into a first, a second and a third operation regions, wherein the first operation region corresponds to a lower stem stroke, and the third operation region corresponds to a higher stem stroke of the butterfly valve, providing a first set of PID parameters for the first operation region such that the butterfly valve functions as an on/off control valve in the first operation region, providing a second set of PID parameters for the second operation region such that the butterfly valve functions as a percentage control valve in the second operation region, and providing a third set of PID parameters for the third operation region such that the butterfly valve functions as an on/off control valve in the third operation region, wherein the first and third sets of PID parameters produce a greater output level than the second set of PID parameters.

In one aspect, the method further comprises defining the second operation region into a plurality of sub-regions, and providing a set of PID parameters for each of the sub-regions such that the butterfly valve functions as a percentage control valve in each of the sub-regions, wherein the first and third sets of PID parameters produce a greater output level than each set of PID parameters provided for each sub-region.

In another aspect, the second operation region is responsible for approximately 80% of the maximum output level of the butterfly valve.

Also in accordance with the present invention, there is provided a method of operating a butterfly valve that includes defining the stem stroke of the butterfly valve into a first operation region, at least one second operation region, and a third operation region, providing a first set of PID parameters for the first operation region, providing at least one second set of PID parameters to the at least one second operation region such that the second set of PID parameters corresponds to the second operation region, providing a third set of PID parameters for the third operation region, wherein the first and third sets of PID parameters produce a greater output level than the second set of PID parameters, determining a target output level for the butterfly valve, providing a pre-determined output level for the second operation region, and operating the butterfly valve to attain the pre-determined output level for the second operation region toward the target output level.

In one aspect, the butterfly valve functions as an on/off control valve in one of the first operation region and the third operation region.

In another aspect, the butterfly valve functions as a percentage control valve in the at least one second operation region.

Still in accordance with the present invention, there is provided a method of operating a butterfly valve that includes defining the stem stroke of the butterfly valve into a first, a second and a third operation regions, providing a first set of PID parameters for the first operation region such that the butterfly valve functions as an on/off control valve, providing a second set of PID parameters for the second operation region such that the butterfly functions as a percentage control valve, wherein the first set of PID parameters produce a greater output level than the second set of PID parameters, coupling the butterfly valve to a load operable between a maximum load value and a minimum load value, coupling the butterfly valve to a first valve, and controlling a flow rate of the first valve for the butterfly valve to operate in the second operation region.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate embodiments consistent with the invention and, together with the description, serve to explain the objects, advantages, and principles of the invention.

In the drawings.

DESCRIPTION OF THE EMBODIMENTS

Reference will now be made in detail to embodiments consistent with the invention, examples of which are illustrated in the accompanying drawings. Wherever possible, the same reference numbers will be used throughout the drawings to refer to the same or like parts.

Figure 1:
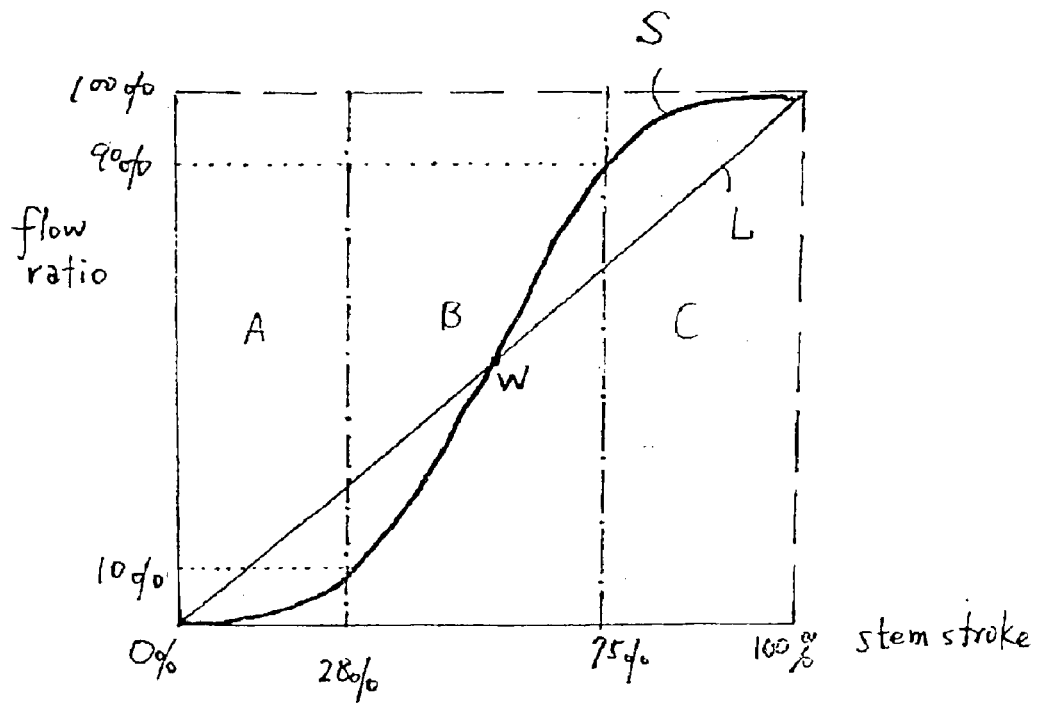
FIG. 1 shows a characteristics curve of a conventional butterfly valve used for percentage control.
Figure 2:
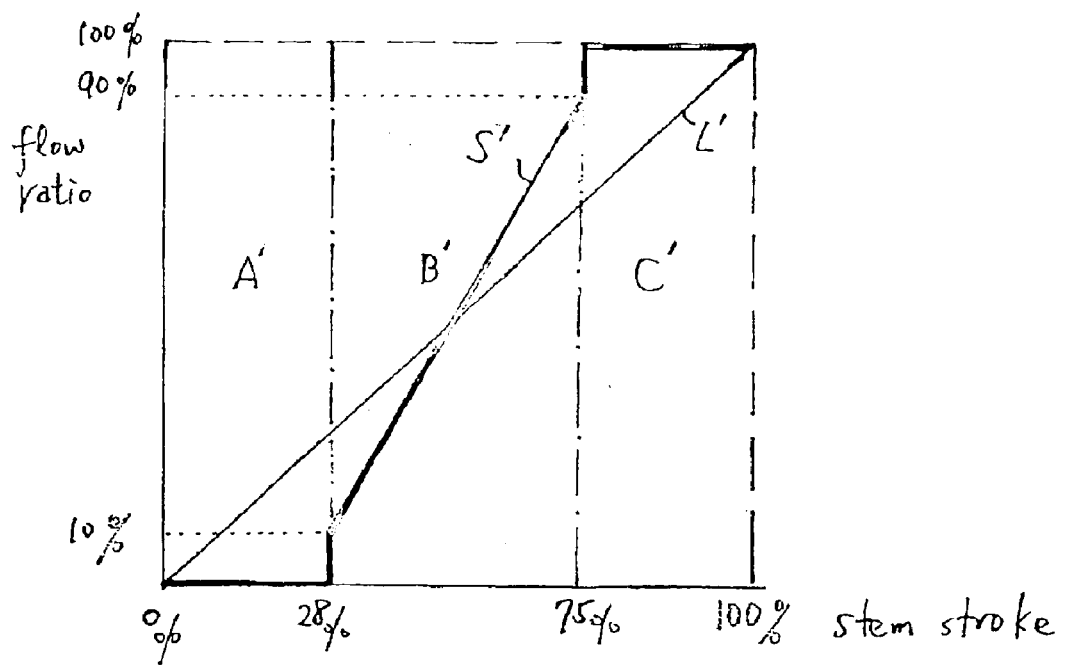
FIG. 2 shows a simulated characteristics line of a butterfly valve in accordance with one embodiment of the present invention.

FIG. 2 shows a simulated characteristics line of a butterfly valve operating in accordance with one embodiment of the present invention. Referring to FIG. 2, the horizontal coordinate is the stem stroke of a butterfly valve, and the vertical coordinate is a flow ratio between the current volume of flow and the maximum volume of flow of the butterfly valve. Straight line L' represents an ideal percentage control relationship between the stem stroke and flow ratio of a butterfly valve. Characteristics line S' may be defined into three operation regions A', B' and C'. Region A' corresponds to approximately the 0-th to $30^{th}$ percentage of the entire stem stroke, and is only responsible for approximately the first 10% of the maximum volume of flow. Region C' corresponds to approximately the $70^{th}$ to $100^{th}$ percentage of the entire stem stroke, and is only responsible for approximately the last 10% of the maximum volume of flow. In one embodiment, regions A' and C' correspond to approximately the 0-th to $28^{th}$ percentage, and the $75^{th}$ to $100^{th}$ percentage of the entire stem stroke of the butterfly valve, respectively.

A percentage control valve consistent with the present invention operates in accordance with the following equation:

$$Y = PE + I \int E dt + D dE/dt$$

wherein Y represents an output level, or in the present case, the flow ratio of a butterfly valve. P, I, and D are respectively the proportion (P), integration (I) and differentiation (D) parameters of a proportional-integral-differential ("PID") control, and E is a deviation from a pre-determined value. The P, I and D parameters are usually fixed values determined by a tuning operation to satisfy equipment specifications.

To address the problem that regions A' and C' are inefficient operation regions for a butterfly valve, the method in accordance with one embodiment of the present invention includes providing a first, a second and a third sets of PID parameters for regions A', B' and C', respectively. The first and third sets of PID parameters are selected to ensure that a butterfly valve functions to serve as an on/off control valve in regions A' and C'. Specifically, the first and third sets of PID parameters are great enough to quickly produce a flow ratio of approximately 10% of the maximum volume of flow of the butterfly valve. Furthermore, the second set of PID parameters produces a smaller output flow ratio than the first or third set of PID parameters to ensure a percentage control in region B'. As a result, the butterfly valve is able to quickly enter region B' and operate in this operation region.

Figure 3:
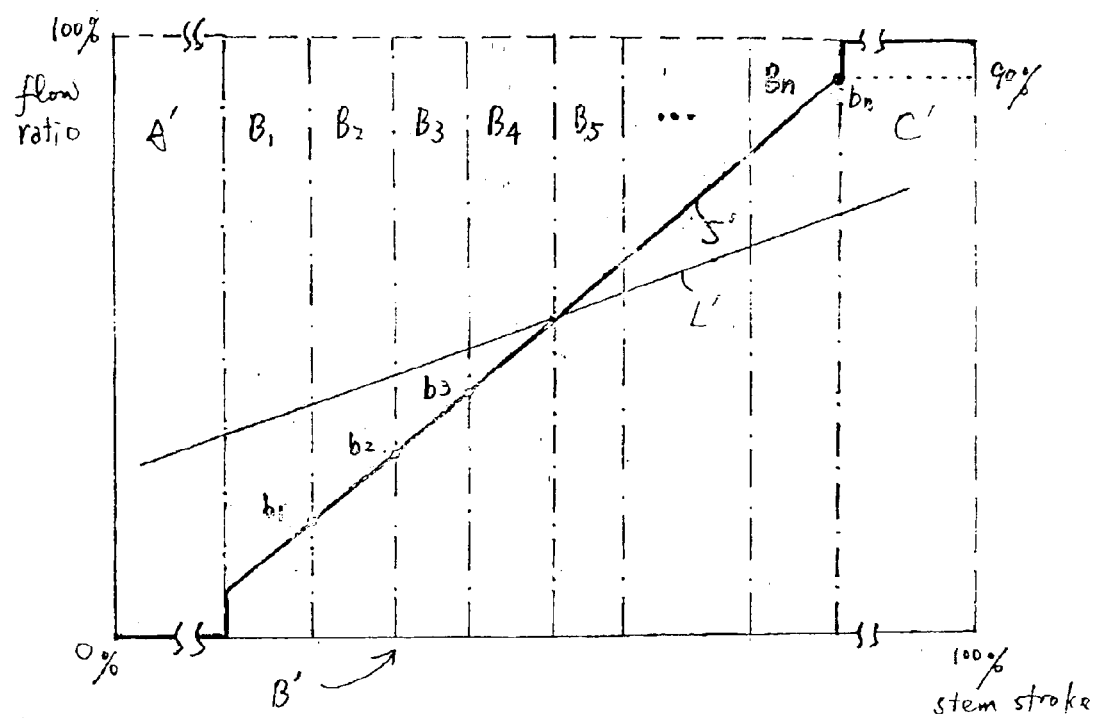
FIG. 3 shows a characteristics line of a butterfly valve in accordance with one embodiment of the present invention.

FIG. 3 shows a characteristics line of a butterfly valve operating in accordance with another embodiment of the present invention. Referring to FIG. 3, operation region B' is divided into a plurality of sub-regions $B_1$ to $B_n$. Each of sub-regions $B_1$ to $B_n$ is provided with a set of PID parameters that produces a smaller output flow ratio than the first or third set of PID parameters. This approach enables an improved percentage control than that shown with in FIG. 2, and prevents overshoot that might otherwise occur in a PID control mechanism.

In another embodiment, a method of the present invention includes determining a target output level, for example, the 90% flow ratio, for the butterfly valve, and providing a pre-determined output level $b_1$ to $b_n$ for each of sub-regions $B_1$ to $B_n$ of operation region B'. The butterfly valve attains each pre-determined output levels in a stepwise manner toward the target output level to prevent "overshooting" the target output level. The offset between the current output level and the next pre-determined output level is kept below a threshold value to provide an acceptable steady-state deviation.

Figure 4:
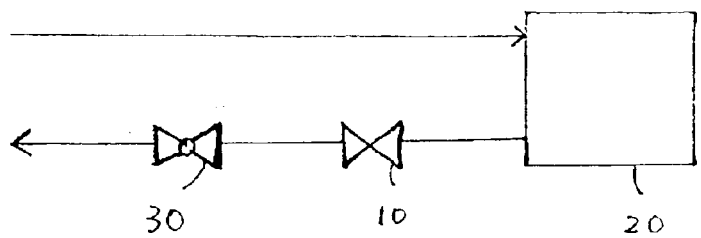
FIG. 4 shows an implementation block diagram of a butterfly valve in accordance with one embodiment of the present invention.

FIG. 4 shows a block diagram of an implementation of a butterfly valve in accordance with one embodiment of the present invention. Referring to FIG. 4, a butterfly valve 10 is coupled at one end to a load 20 operable between a maximum load value and a minimum load value. A different valve, for example, a global valve 30 or a different butterfly valve, is coupled to butterfly valve 10 at the other end to ensure that butterfly valve 10 operates in region B'. As an example, load 20 has a maximum flow rate of 20 gallons per minute (gpm) and a minimum flow rate of 1 gpm. In the case that the maximum volume of flow of butterfly valve 10 is also 20 gpm, butterfly valve 10 operates in region B' when the volume of flow per minute falls between 2 (=20×10%) and 18 (=20×90%) gallons. However, if the maximum or minimum load value of load 20 is required, a method in accordance with the present invention controls the output level of valve 30 to ensure that the maximum load value of load 20 is reached before butterfly valve 10 enters region C', or controls the output level of valve 30 to ensure that the maximum load value of load 20 is reached before butterfly valve 10 enters region A'.

In one embodiment, load 20 is a heat exchanger that recycles heat transmitted from other working equipment. The heat exchanger includes a heat transfer medium (not shown) and provided with a rating temperature ($T_{HE}$) above which the heat exchanger does not work properly. To ensure that the butterfly valve 10 coupled to the heat exchanger operates in region B', a method in accordance with the invention includes providing a pre-determined working temperature ($T_W$) for the heat exchanger, and resetting the pre-determined working temperature $T_W$ to follow the relationship: $T_{HE}+T_M \geq 2\ T_W$, wherein $T_M$ is the temperature of the heat transfer medium. In another embodiment, the value of $T_{HE}+T_M$ is kept slightly greater than 2 $T_W$.

It will be apparent to those skilled in the art that various modifications and variations can be made in the disclosed process without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of operating a butterfly valve, comprising:
   defining the stem stroke of the butterfly valve into a first, a second and a third operation regions, wherein the first operation region corresponds to a lower stem stroke, and the third operation region corresponds to a higher stem stroke of the butterfly valve;
   providing a first set of proportion, integration, and differentiation parameters for the first operation region such that the butterfly valve functions as an on/off control valve in the first operation region;
   providing a second set of proportion, integration, and differentiation parameters for the second operation region such that the butterfly valve functions as a percentage control valve in the second operation region; and
   providing a third set of proportion, integration, and differentiation parameters for the third operation region such that the butterfly valve functions as an on/off control valve in the third operation region,
   wherein the first and third sets of proportion, integration, and differentiation parameters produce a greater output level than the second set of proportion, integration, and differentiation parameters.

2. The method of claim 1, further comprising:
   defining the second operation region into a plurality of sub-regions; and
   providing a set of proportion, integration, and differentiation parameters for each of the sub-regions such that the butterfly valve functions as a percentage control valve in each of the sub-regions,
   wherein the first and third sets of proportion, integration, and differentiation parameters produce a greater output level than each set of proportion, integration, and differentiation parameters provided for each sub-region.

3. The method of claim 2, further comprising:
   determining a target output level for the butterfly valve;
   providing a pre-determined output level for each of the sub-regions of the second operation region; and
   operating the butterfly valve to attain the pre-determined output level for each of the sub-regions toward the target output level.

4. The method of claim 1, wherein the first operation region corresponds to stem stroke percentages of approximately 0%–30%.

5. The method of claim 1, wherein the second operation region corresponds to stem stroke percentages of approximately 25%–80%.

6. The method of claim 1, wherein the third operation region corresponds to stem stroke percentages of approximately 70%–100%.

7. The method of claim 1, wherein the first operation region is responsible for approximately 10% of the maximum output level of the butterfly valve.

8. The method of claim 1, wherein the second operation region is responsible for approximately 80% of the maximum output level of the butterfly valve.

9. The method of claim 1, wherein the third operation region is responsible for approximately 10% of the maximum output level of the butterfly valve.

10. The method of claim 1, wherein the butterfly valve is a first valve, the method further comprising:
    coupling the butterfly valve to a load operable between a maximum load value and a minimum load value;
    coupling the butterfly valve to a second valve; and
    controlling an output level of the second valve to ensure that the butterfly valve operates in the second operation region.

11. The method of claim 10, further comprising controlling the output level of the second valve to ensure that the maximum load value of the load is reached before the first valve enters the third operation region.

12. The method of claim 10, further comprising controlling the output level of the second valve to ensure that the minimum load value of the load is reached before the first valve enters the first operation region.

13. The method of claim 10, wherein the load is a heat exchanger including a heat transfer medium.

14. The method of claim 13, further comprising:
    providing the heat exchanger with a rating temperature ($T_{HE}$);
    providing a pre-determined working temperature ($T_W$) for the heat exchanger; and
    keeping the butterfly valve operating in the second region by resetting the pre-determined working temperature $T_W$ to follow the relationship: $T_{HE}+T_M \geq 2\ T_W$
    wherein $T_M$ is the temperature of the heat transfer medium.

15. The method of claim 1, wherein the step of resetting the pre-determined working temperature $T_W$ includes keeping the value of $T_{HE}+T_M$ slightly greater than that of 2 $T_W$.

16. A method of operating a butterfly valve, comprising:
    defining the stem stroke of the butterfly valve into a first operation region, at least one second operation region, and a third operation region;
    providing a first set of proportion, integration, and differentiation parameters for the first operation region;
    providing at least one second set of proportion, integration, and differentiation parameters to the at least one second operation region such that the second set of proportion, integration, and differentiation parameters corresponds to the second operation region;
    providing a third set of proportion, integration, and differentiation parameters for the third operation region, wherein the first and third sets of proportion, integration, and differentiation parameters produce a greater output level than the second set of proportion, integration, and differentiation parameters;
    determining a target output level for the butterfly valve;
    providing a pre-determined output level for the second operation region; and
    operating the butterfly valve to attain the pre-determined output level for the second operation region toward the target output level.

17. The method of claim 16, wherein the butterfly valve functions as an on/off control valve in one of the first operation region and the third operation region.

18. The method of claim 16, wherein the butterfly valve functions as a percentage control valve in the at least one second operation region.

19. A method of operating a butterfly valve, comprising:

defining the stem stroke of the butterfly valve into a first, a second and a third operation regions;

providing a first set of proportion, integration, and differentiation parameters for the first operation region such that the butterfly valve functions as an on/off control valve;

providing a second set of proportion, integration, and differentiation parameters for the second operation region such that the butterfly functions as a percentage control valve, wherein the first set of proportion, integration, and differentiation parameters produce a greater output level than the second set of proportion, integration, and differentiation parameters;

coupling the butterfly valve to a load operable between a maximum load value and a minimum load value;

coupling the butterfly valve to another valve; and controlling a flow rate of the first valve for the butterfly valve to operate in the second operation region.

20. The method of claim 19, further comprising:

defining the second operation region into a plurality of sub-regions; and providing a set of proportion, integration, and differentiation parameters for each of the sub-regions, wherein the first set of proportion, integration, and differentiation parameters produce a greater output level than each set of proportion, integration, and differentiation parameters provided for each of the plurality of sub-regions.

21. The method of claim 20, further comprising:

determining a target output level for the butterfly valve;

providing a pre-determined output level for each of the sub-regions of the second operation region; and operating the butterfly valve to attain the pre-determined output level for each of the sub-regions toward the target output level.

* * * * *